United States Patent
Mo

(10) Patent No.: US 8,503,365 B2
(45) Date of Patent: Aug. 6, 2013

(54) APPARATUS AND METHOD FOR DETECTING CELL IN WIRELESS COMMUNICATION SYSTEM

(75) Inventor: Yun Sung Mo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 284 days.

(21) Appl. No.: 12/857,087

(22) Filed: Aug. 16, 2010

(65) Prior Publication Data

US 2011/0038336 A1    Feb. 17, 2011

(30) Foreign Application Priority Data

Aug. 14, 2009  (KR) .................. 10-2009-0075064

(51) Int. Cl.
  *H04W 4/00* (2009.01)
  *H04W 36/00* (2009.01)
  *H04B 7/208* (2006.01)
  *H04W 88/00* (2009.01)
  *H04L 5/00* (2006.01)
  *H04W 48/16* (2009.01)

(52) U.S. Cl.
  CPC .......... *H04W 88/00* (2013.01); *H04L 5/0007* (2013.01); *H04W 48/16* (2013.01)
  USPC ........... 370/328; 370/344; 455/434; 455/443

(58) Field of Classification Search
  USPC ............... 370/328–332, 343, 344; 455/422.1, 455/434, 436, 437, 443
  See application file for complete search history.

(56) References Cited

U.S. PATENT DOCUMENTS

| | | | |
|---|---|---|---|
| 2008/0080439 A1* | 4/2008 | Aziz et al. ..................... | 370/338 |
| 2008/0089282 A1* | 4/2008 | Malladi et al. ................. | 370/329 |
| 2009/0225824 A1* | 9/2009 | Noh et al. ...................... | 375/240 |
| 2009/0232125 A1* | 9/2009 | Kim et al. ...................... | 370/350 |
| 2010/0069066 A1* | 3/2010 | Shen et al. ..................... | 455/434 |
| 2010/0177726 A1* | 7/2010 | Olszewski ..................... | 370/329 |
| 2011/0009138 A1* | 1/2011 | Kim et al. ...................... | 455/507 |

* cited by examiner

*Primary Examiner* — Paul H Masur
(74) *Attorney, Agent, or Firm* — The Farrell Law Firm, P.C.

(57) ABSTRACT

A method and apparatus for detecting a cell in a mobile communication system such as an LTE (Long Term Evolution) system are provided. In the method, when a signal is received from at least one base station, a primary synchronization channel (PSCH) detector detects a PSCH symbol in the signal. Then a PSCH validity determiner ascertains a valid value of the PSCH symbol and determines whether the valid value is greater than a given threshold. If the PSCH symbol is greater than the threshold, a secondary synchronization channel (SSCH) allocator estimates a position of an SSCH symbol in the signal using the PSCH symbol. Then an SSCH detector detects the SSCH symbol at the estimated position, so that a neighboring cell can be found through the detected SSCH symbol.

9 Claims, 7 Drawing Sheets

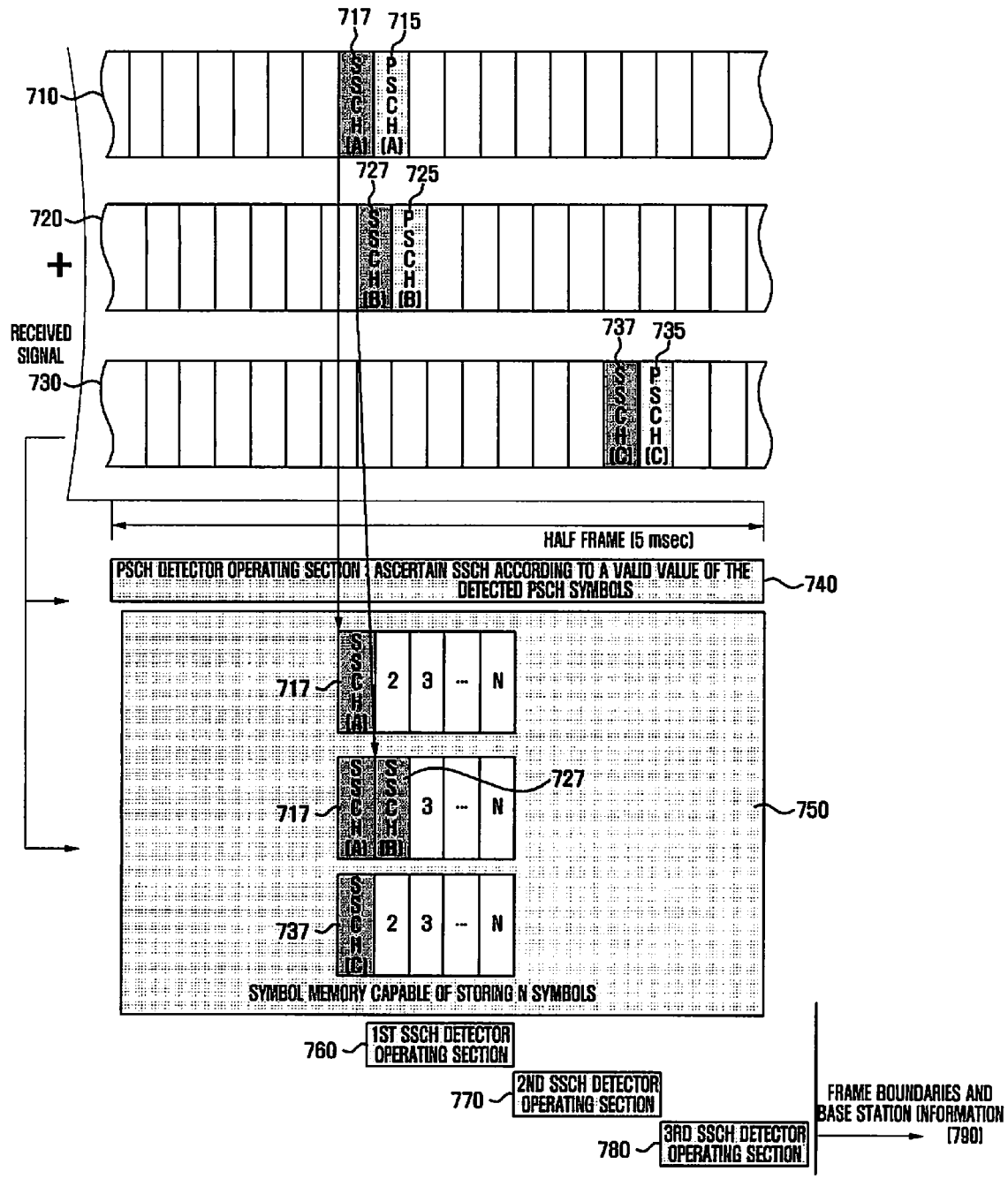

APPARATUS AND METHOD FOR DETECTING CELL IN WIRELESS COMMUNICATION SYSTEM

PRIORITY

This application claims priority under 35 U.S.C. §119(a) to an application filed in the Korean Intellectual Property Office on Aug. 14, 2009, and assigned Serial No. 10-2009-0075064, the contents of which are incorporated herein by reference.

BACKGROUND OF THE INVENTION

1. Field of the Invention

The present invention relates in general to an apparatus and method for detecting a cell in a mobile communication system and, more particularly, to an apparatus and method for detecting a cell containing a base station to be synchronized with a mobile device in an LTE (Long Term Evolution) system.

2. Description of the Related Art

A mobile communication system based on an OFDM (Orthogonal Frequency Division Multiplexing) system such as an LTE system is normally composed of a base station and a mobile device (also referred to as a User Equipment (UE), a mobile terminal or a mobile station). A base station and a mobile device establish a link for data transmission. A link from a mobile device to a base station is referred to as an uplink, whereas a link from a base station to a mobile device is referred to as a downlink.

A signal in the downlink is transmitted in the form of continuous frames each having 10 msec size. A 10 msec frame is composed of two 5 msec half frames. In addition, a single half frame is composed of five 1 msec sub frames. Each sub frame has a plurality of slots and symbol units. In the OFDM system, a symbol is used as a frequency conversion unit.

Generally, a mobile device ascertains a point of time to synchronize with a neighboring base station before performing FFT (Fast Fourier Transform). For this, a mobile device detects the primary synchronization channel (PSCH) symbol containing information about boundaries of a half frame in a signal received from a neighboring base station through the downlink. After finishing the detection of the PSCH symbol, a mobile device detects the secondary synchronization channel (SSCH) symbol containing information about a base station on the frequency axis. Through the PSCH symbol and the SSCH symbol, a mobile device can obtain information about all frame boundaries and information about a base station. Then by using such information, a mobile device can detect a neighboring cell.

Namely, the acquisition of synchronization between a base station and a mobile device begins with detecting boundaries of a half frame by using the PSCH symbol. Since there is no timing information, the detection of the PSCH symbol is performed immediately on the time axis. Once the detection of the PSCH symbol is finished, a mobile device can find only boundaries of a half frame. Since the PSCH symbol is always transmitted in the same position from a base station, and since such positions are unchanged for each half frame, a mobile device cannot ascertain boundaries of the entire frame. However, if the SSCH symbol is detected, a mobile device can find all frame boundaries. In other words, since the configuration mode of the SSCH symbol (i.e., m0, m1 sequence mode) is distinguished by a half frame in a single frame, it is possible to find boundaries of the entire frame according to the position of the SSCH symbol.

Now, a process of detecting a synchronization channel will be described in detail with reference to FIG. 1, which is a flow diagram illustrating a conventional method for detecting a synchronization channel.

Referring to FIG. 1, a mobile device receives a signal transmitted from a base station that controls neighboring cells around that device in step 110. Then the mobile device detects the PSCH symbol in the received signal in step 120. Through the detected PSCH symbol, the mobile device roughly finds the boundary of a downlink half frame. Next, the mobile device determines whether the detection of the PSCH symbol is finished in step 130. Here, the mobile device temporarily stores the received signal in a memory until the PSCH symbol detection is finished.

After the PSCH symbol detection, the mobile device determines whether the detected PSCH symbol is valid in step 140. If the PSCH symbol is valid, the mobile device detects the SSCH symbol at an estimated position in step 150. Namely, when the PSCH symbol is completely detected, the mobile device estimates the position of the SSCH symbol by using the detected PSCH symbol. Specifically, the mobile device finds the boundary of a half frame in the PSCH symbol and estimates the position of the SSCH symbol. Then the mobile device detects the SSCH symbol in the signal temporarily stored in the memory. The SSCH symbol contains information about all frame boundaries and information about a base station. Here, "base station information" means the base station ID used for identifying a base station.

When the SSCH symbol is also detected, the mobile device then can ascertain information all frame boundaries and information about a base station in step 160. Then the mobile device can detect a cell controlled by the base station corresponding to ascertained information.

In order to detect the SSCH symbol, the mobile device should convert a symbol estimated to be the SSCH symbol into that on the frequency domain. The position of the estimated SSCH symbol may be found after the boundary of a half frame is detected. That is, the SSCH symbol may be detected only after the PSCH symbol is detected. However, since the detection of the SSCH symbol is delayed until the detection of the PSCH is finished, it may take a longer time to completely detect information about a base station and then to perform synchronization.

In addition, the mobile device should store all signals received while the PSCH symbol is detected. Namely, since the SSCH symbol is not known to be located at which region of a received signal, the mobile device must store all signals during the detection of the PSCH symbol.

SUMMARY OF THE INVENTION

Accordingly, the present invention has been made to address the above-mentioned problems and/or disadvantages and to offer at least the advantages described below.

Aspects of the present invention provide an apparatus and method for detecting a cell in a mobile communication system.

According to one aspect of the present invention, a method for detecting a cell in a mobile device is provided. The method includes, when a signal is received from at least one base station, detecting a primary synchronization channel (PSCH) symbol in the signal; ascertaining a valid value of the PSCH symbol and thereby determining whether the valid value is greater than a given threshold; if the PSCH symbol is greater than the threshold, estimating a position of a secondary synchronization channel (SSCH) symbol in the signal by using the PSCH symbol; detecting the SSCH symbol at the estimated position; and finding a neighboring cell through the detected SSCH symbol.

According to another aspect of the present invention, an apparatus for detecting a cell is provided. The apparatus receives a signal in the form of a frame from a base station through the downlink. The apparatus includes a primary synchronization channel (PSCH) detector configured to detect a PSCH symbol in the signal; a PSCH validity determiner configured to ascertain a valid value of the PSCH symbol and thereby to determine whether the valid value is greater than a given threshold; a secondary synchronization channel (SSCH) allocator configured to, if the PSCH symbol is greater than the threshold, estimate a position of an SSCH symbol in the signal by using the PSCH symbol; and an SSCH detector configured to detect the SSCH symbol at the estimated position.

BRIEF DESCRIPTION OF THE DRAWINGS

The above and other aspects, advantages, and features of the invention will become apparent to those skilled in the art from the following detailed description, which, taken in conjunction with the annexed drawings, discloses embodiments of the invention.

FIG. 7 illustrates a process of detecting a synchronization channel symbol contained in three frames in accordance with still another embodiment of the present invention.

DETAILED DESCRIPTION OF THE INVENTION

Exemplary, non-limiting embodiments of the present invention will now be described more fully with reference to the accompanying drawings. This invention may, however, be embodied in many different forms and should not be construed as limited to the embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

Furthermore, well known or widely used techniques, elements, structures, and processes may not be described or illustrated in detail to avoid obscuring the essence of the present invention. Although the drawings represent embodiments of the invention, the drawings are not necessarily to scale and certain features may be exaggerated or omitted in order to better illustrate and explain the present invention.

The primary synchronization channel (hereinafter referred to as PSCH) symbol is a symbol that contains information about boundaries of a half frame, a symbol of each slot, etc. for synchronizing slots between a base station and a mobile device.

The secondary synchronization channel (hereinafter referred to as SSCH) symbol is a symbol that contains information about boundaries of the entire frame, the ID of a base station sending a frame, etc. for synchronizing frames between a base station and a mobile device.

Figure 1:
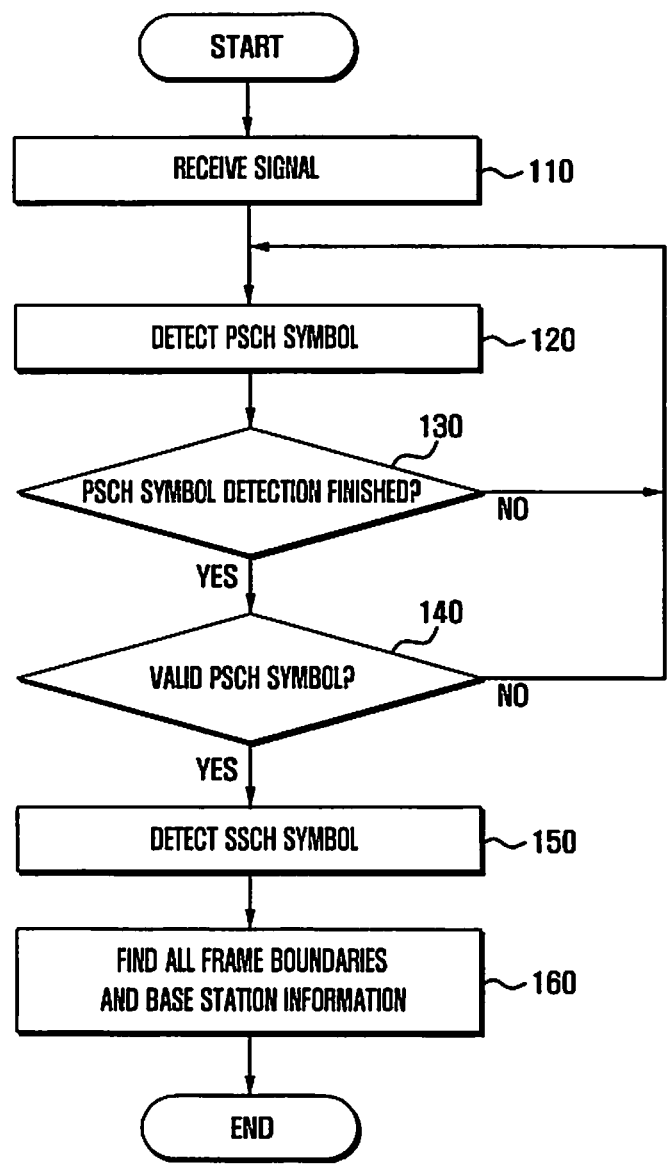
FIG. 1 is a flow diagram illustrating a conventional method for detecting a synchronization channel.
Figure 2:
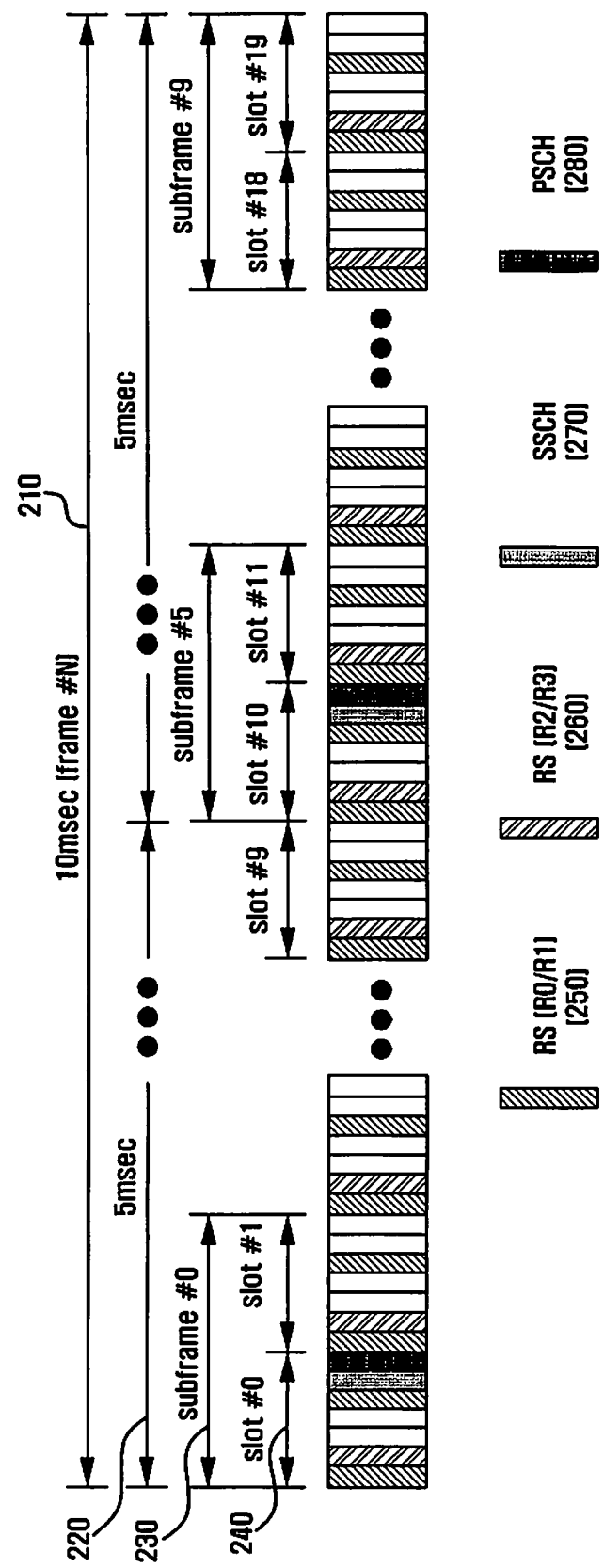
FIG. 2 illustrates a frame structure in accordance with an embodiment of the present invention.

FIG. 2 illustrates a frame structure in accordance with an embodiment of the present invention.

Referring to FIG. 2, a signal transmitted from a base station in the form of a frame. A single frame 210 with a 10 msec size is composed of two half frames each having 5 msec size. In addition, a single half frame 220 is composed of five sub frames, and each sub frame 230 has a plurality of slots and symbol units 240. A resource is allocated to each symbol. Such resources include RS (reference signal) (R0/R1) 250, RS (R2/R3) 260, SSCH 270, PSCH 280, etc.

As shown in FIG. 2, a single PSCH symbol 280 is always located within a half frame 220 that is a particular time window (at least 5 msec sized). Therefore, through observations on a received signal during a particular time window, the mobile device can find a position on the time axis at which the PSCH symbol is located. Additionally, by using the position of the PSCH symbol, the mobile device can also find a point of time corresponding to an estimated position of the SSCH symbol. For instance, when the position of the PSCH symbol 280 is determined, the SSCH symbol 270 is located one symbol ahead of the PSCH symbol 280 in the FDD (Frequency Division Duplexing) mode and located three symbols ahead of the PSCH symbol 280 in the TDD (Time Division Duplexing) mode. The PSCH symbol 280 can be continuously detected for each half frame 220 received on the time axis. In addition, the SSCH symbol 270 can be detected on the frequency axis. Therefore, the mobile device is required to convert a symbol containing the SSCH on the time axis into that on the frequency domain. For this, FFT (Fast Fourier Transform) is normally used. Namely, by using the FFT technique, the mobile device converts a symbol to which the SSCH may be allocated on the time domain into that on the frequency domain. Now, the configuration of the mobile device that detects a symbol will be described with reference to FIG. 3, which is a block diagram illustrating the configuration of a receiver in a user equipment in accordance with an embodiment of the present invention.

Figure 3:
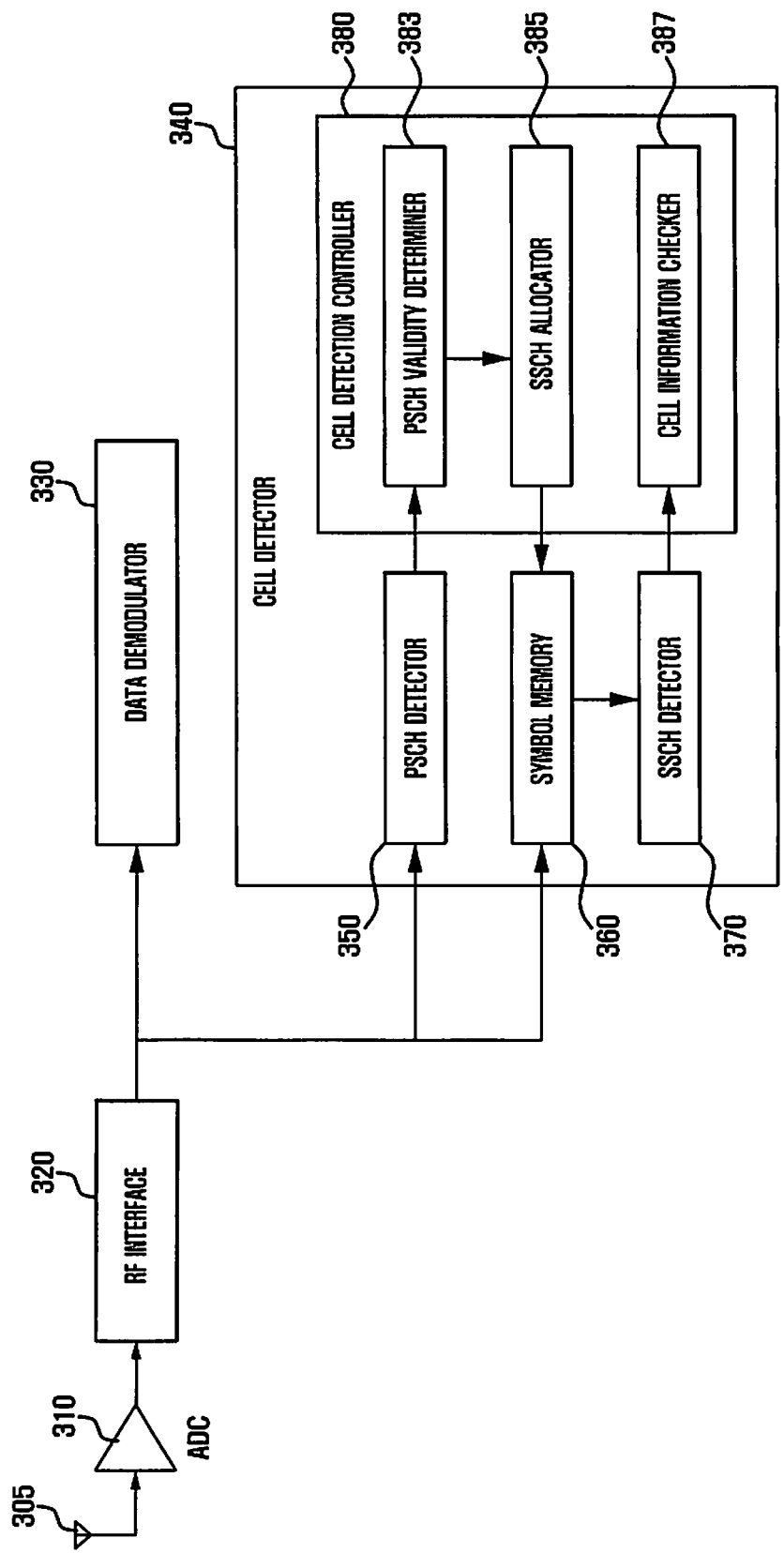
FIG. 3 is a block diagram illustrating the configuration of a receiver in a user equipment in accordance with an embodiment of the present invention.

Referring to FIG. 3, the receiver of the user equipment includes an antenna 305, an ADC (analog to digital convertor) 310, an RF (radio frequency) interface 320, a data demodulator 330, and a cell detector 340.

The antenna 305 receives an analog signal transmitted from the base station.

The ADC 310 converts an analog signal received from the base station into a digital signal. Hereinafter, a digital signal will simply be referred to as a signal.

The RF interface 320 may include an AGC (Automatic Gain Control), an AFC (Automatic Frequency Control), an Rx decimation filter, and the like. The AGC performs a function to maintain a uniform level by controlling a gain of a converted signal. The AFC performs a function to compensate a frequency offset of a converted signal. The Rx decimation filter reduces a clock frequency of a signal. A signal extracted through the RF interface 320 is delivered to the data demodulator 330 and the cell detector 340.

The data demodulator 330 demodulates an extracted signal to data.

The cell detector 340 arranges time between the mobile device and the base station at the initial stage and then decodes selected information from a signal. Additionally, in case of a handover, the cell detector 340 changes a time arrangement to allow for continuous decoding without acquiring synchronization. For this, the cell detector 340 includes a PSCH detector 350, a symbol memory 360, an SSCH detector 370, and a cell detection controller 380.

The PSCH detector 350 detects, under the control of the cell detection controller 380, the PSCH symbol that helps to find boundaries of a half frame in a signal received from the base station. The symbol memory 360 stores, under the control of the cell detection controller 380, a signal received while the PSCH symbol is detected, and a number of extracted SSCH symbols. The SSCH detector 370 detects, under the control of the cell detection controller 380, the SSCH symbol in a signal stored in the symbol memory 360.

In order to detect the SSCH symbol according to this embodiment, the validity of the PSCH symbol should be determined first of all. Additionally, if the validity of the PSCH symbol is greater than a given threshold, the SSCH symbol can be detected. These steps are performed in the cell detection controller 380 that includes a PSCH validity determiner 383, an SSCH allocator 385, and a cell information checker 387.

The PSCH validity determiner 383 determines whether a valid value of the PSCH symbol detected through the PSCH detector 350 is greater than a given threshold. A valid value of the PSCH symbol may be determined as a correlation value obtained through a matched filter. If a valid value of the PSCH symbol is greater than a given threshold, the cell detection controller 380 estimates through the SSCH allocator 385 the position of the SSCH symbol in a signal stored in the symbol memory 360. Here, a given threshold may be varied according to communication environments between the base station and the mobile device, and may be determined through tests under various communication environments.

The cell detection controller 380 controls the SSCH detector 370 to detect the SSCH symbol in a signal stored in the symbol memory 360. The detected SSCH symbol is delivered to the cell information checker 387 in the cell detection controller 380. Then the cell information checker 387 ascertains, through the detected SSCH symbol, the ID of a neighboring base station and base station information regarding synchronization timing between the base station and the mobile device. Now, a method for detecting a symbol at the receiver of the mobile device will be described with reference to FIG. 4, which is a flow diagram illustrating a method for detecting a cell in accordance with an embodiment of the present invention.

Figure 4:
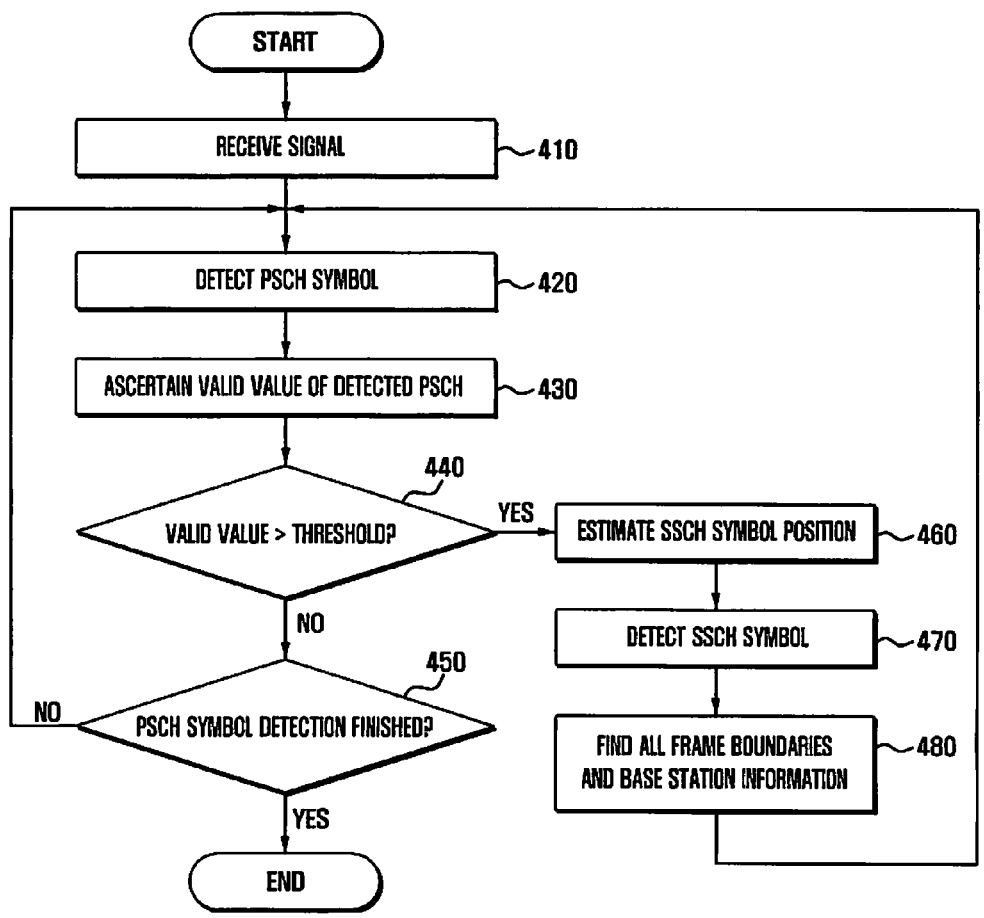
FIG. 4 is a flow diagram illustrating a method for detecting a cell in accordance with an embodiment of the present invention.

Referring to FIGS. 3 and 4, when a signal containing the PSCH and SSCH symbols is received from at least one base station around the mobile device in step 410, the cell detection controller 380 controls the PSCH detector 350 to detect the PSCH symbol contained in the received signal in step 420. In addition, the cell detection controller 380 stores the received signal in the symbol memory 360 while the PSCH symbol is detected. Namely, by controlling the PSCH detector 350, the cell detection controller 380 receives the PSCH symbol within a half frame and then extracts given candidates for a valid PSCH symbol. Also, the cell detection controller 380 selects the position of the valid PSCH symbol among the extracted candidates. Such PSCH symbol candidates may be selected after the time of a half frame passes. The position of the SSCH symbol may be estimated through the position of the PSCH symbol registered as candidates.

The cell detection controller 380 ascertains a valid value of the detected PSCH symbol in step 430. A valid value of the PSCH symbol means a correlation value obtained through a matched filter. A correlation value will increase as the base station moves closer to the mobile device, as a signal is received directly rather than received through multiple paths, and as channel interference is slight.

Next, the cell detection controller 380 determines whether a valid value of the PSCH symbol is greater than a given threshold in step 440. If a valid value of the PSCH symbol is smaller than a given threshold, the cell detection controller 380 determines whether the detection of the PSCH symbol is finished in step 450. If the detection of the PSCH symbol is finished, the cell detection controller 380 then detects the SSCH symbol on the basis of the detected PSCH symbol. Since the SSCH detector has been already driven to detect the SSCH symbol, the operation of the PSCH cell detector is finished. On the other hand, if the detection of the PSCH symbol is not finished, the cell detection controller 380 performs again previous steps by returning to the aforesaid step 420.

In step 440, if a valid value of the PSCH symbol is greater than a given threshold, the cell detection controller 380 estimates the position of the SSCH symbol in a signal stored in the symbol memory 360 in step 460. Additionally, the cell detection controller 380 detects the SSCH symbol at the estimated position in step 470. Here, the SSCH symbol contains information about all boundaries of a frame transmitted from the base station and information about the base station around the mobile device.

The cell detection controller 380 ascertains all frame boundaries and base station information through the detected SSCH symbol in step 480. Then the cell detection controller 380 finds a neighboring cell by means of base station information ascertained through the SSCH symbol and the PSCH symbol. Here, base station information contains the ID of a neighboring base station around the mobile device.

The cell detection controller 380 allocates the SSCH symbol whenever a valid PSCH symbol is detected, and detects the SSCH symbol through the SSCH detector 370. By repetition of such steps, the cell detector 340 can detect a cell located around the mobile device.

Now, a process of detecting a symbol through a signal transmitted from each base station around the mobile device will be described with reference to FIGS. 5 to 7.

Figure 5:
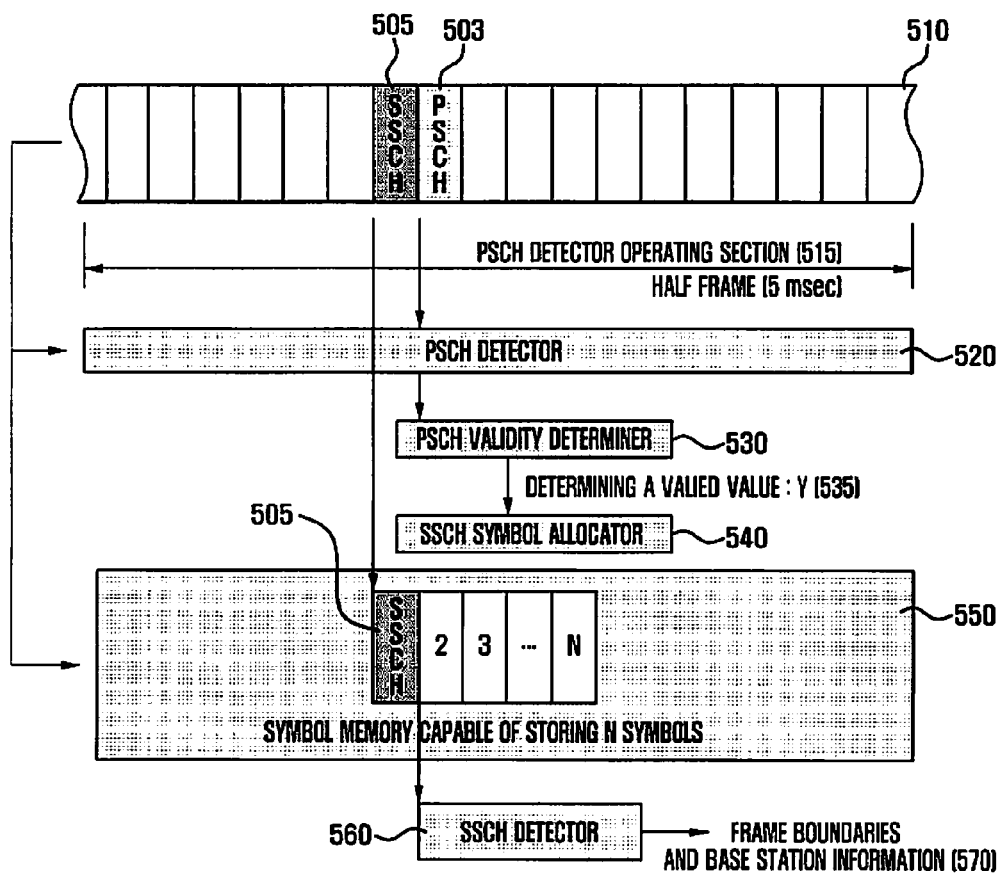
FIG. 5 illustrates a process of detecting a synchronization channel symbol contained in a single frame in accordance with an embodiment of the present invention.

FIG. 5 illustrates a process of detecting a synchronization channel symbol contained in a single frame in accordance with an embodiment of the present invention.

Referring to FIG. 5, when a signal is received in the form of a frame 510 containing the PSCH symbol 503 and the SSCH symbol 505, the mobile device detects the PSCH symbol through the PSCH detector 520 in a PSCH detector operating section 515. Here, the mobile device stores a received signal in the symbol memory 550. The PSCH detector operating section 515 is set on the basis of a half frame with a 5 msec size. Next, as indicated by reference number 535, the mobile device determines a valid value of the PSCH symbol detected through the PSCH validity determiner 530.

If a valid value of the PSCH symbol is greater than a given threshold, the mobile device finds through the SSCH symbol allocator 540 the position of a symbol to which the SSCH is allocated in a signal stored in the symbol memory 550. In addition, the mobile device detects the SSCH symbol 505 through the SSCH detector 560. Then the mobile device analyzes the detected PSCH and SSCH symbols and finds base station information and all frame boundaries 570 corresponding to a signal transmitted from the base station.

Figure 6:
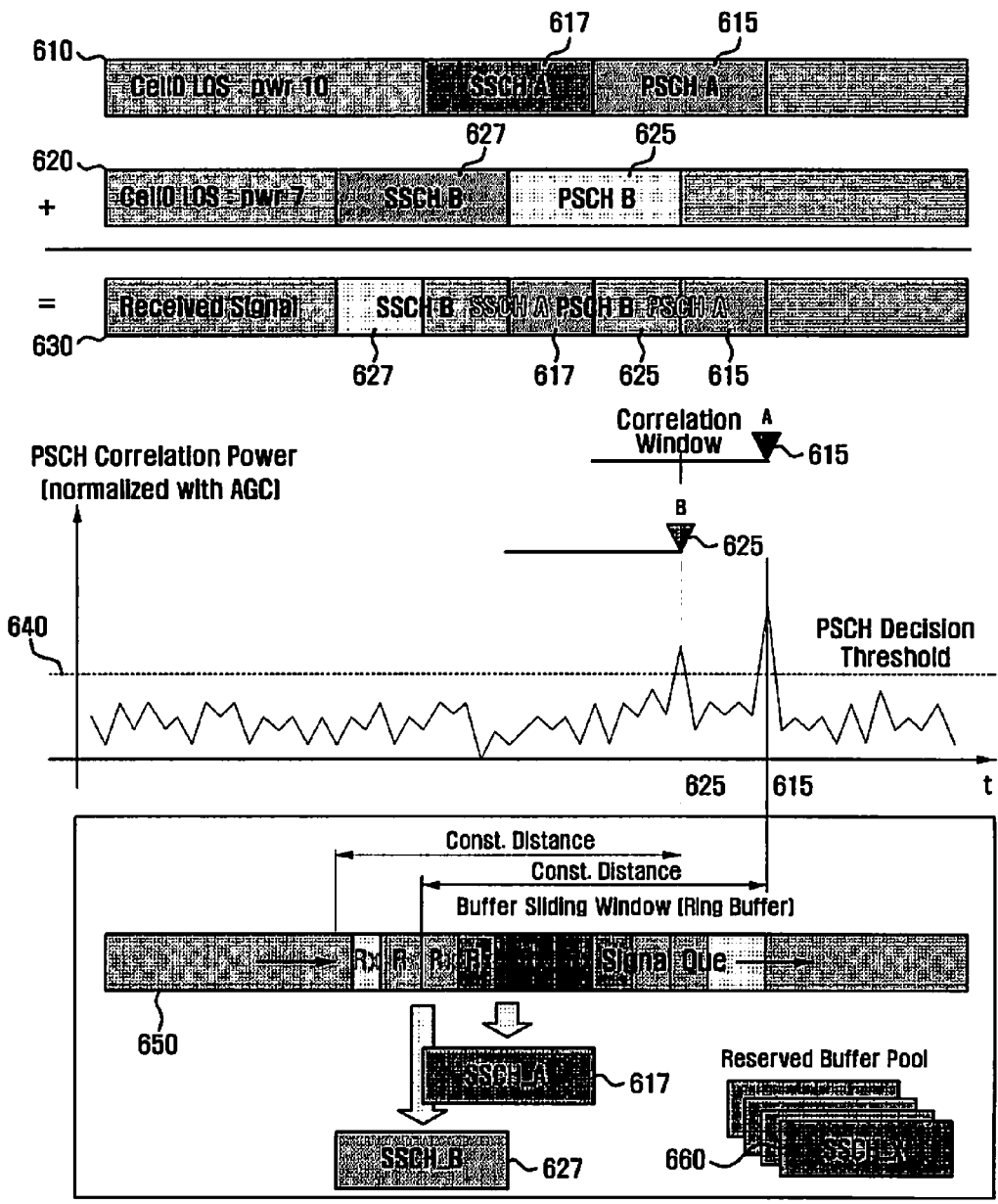
FIG. 6 illustrates a process of detecting a synchronization channel symbol contained in at least two frames in accordance with another embodiment of the present invention.

The following description with reference to FIG. 6 is a case where a signal is transmitted from two base stations, and FIG. 6 illustrates a process of detecting a synchronization channel symbol contained in at least two frames in accordance with another embodiment of the present invention.

Referring to FIG. 6, a base station with a downlink signal strength of 10 transmits a signal in the form of a frame A 610. This frame A 610 contains the PSCH symbol A 615 and the SSCH symbol A 617. Additionally, another base station with a downlink signal strength of 7 transmits a signal in the form of a frame B 620. This frame B 620 contains the PSCH symbol B 625 and the SSCH symbol B 627.

As indicated by reference number 630, the mobile device receives the frame A 610 and the frame B 620 together. Namely, the mobile device receives, at a time the PSCH symbol of a frame transmitted from the current base station around the mobile device, the PSCH symbol of a frame transmitted through multiple paths, the PSCH symbol of a frame transmitted from another base station adjacent to the current base station, and the like. Therefore, when the mobile device detects the PSCH symbol, one or more PSCH symbols may be detected on the time axis.

The mobile device ascertains a valid value of the PSCH symbol to detect the PSCH symbol. A valid value of the PSCH symbol may be found from a correlation value measured through a matched filter. Specifically, a graph in FIG. 6 shows variations in PSCH correlation value (also referred to as PSCH correlation power) with regard to the time axis. As seen from this graph, at points of time to receive respectively the PSCH symbols A 615 and B 625, a measured correlation value, namely a valid value of the PSCH symbols A 615 and B 625, exceeds a given threshold 640.

At the time when a valid value of the PSCH symbol A 615 exceeds the given threshold 640, the mobile device detects the SSCH symbol A 617 in a signal 650 stored in the symbol memory. Similarly, at the time when a valid value of the PSCH symbol B 625 exceeds a given threshold 640, the mobile device detects the SSCH symbol B 627 in the signal 650 stored in the symbol memory. Here, the symbol memory stores earlier detected SSCH symbols 660. If it is determined that another PSCH symbol is valid before the detection of the SSCH symbol is finished, the mobile device may store again the SSCH symbol in the symbol memory. Therefore, the symbol memory has some reserved space for symbol memories. Once one or more SSCH symbols occupy the symbol memory, the SSCH detector begins to operate. If the detection of the SSCH symbol is finished, the symbol memory may be used again as storage for storing other SSCH symbols to be detected later. Meanwhile, the SSCH allocator allocates the SSCH symbol for each symbol memory.

The following description with reference to FIG. 7 is a case where a signal is transmitted from three base stations, and FIG. 7 illustrates a process of detecting a synchronization channel symbol contained in three frames in accordance with still another embodiment of the present invention.

Referring to FIG. 7, a base station located in the nearest cell from the mobile device transmits a signal of a frame A 710 which contains the PSCH symbol A 715 and the SSCH symbol A 717. Also, a signal of a frame B 720 is transmitted from the nearest base station through multiple paths, containing the PSCH symbol B 725 and the SSCH symbol B 727. Additionally, another base station adjacent to the nearest base station transmits a signal of a frame C 730 which contains the PSCH symbol C 735 and the SSCH symbol C 737.

Each signal frame 710, 720, 730 is delivered to the PSCH detector 740 and the symbol memory 750 in the mobile device. The PSCH detector 740 detects the PSCH symbols A 715, B 725 and C 735 on the basis of a half frame. Here, the mobile device ascertains a valid value of the detected PSCH symbols A 715, B 725 and C 735 and thereby finds the position of the SSCH symbols A 717, B 727 and C 737 for each frame.

After the position of the SSCH symbol is found for each frame, the SSCH symbols A 717, B 727 and C 737 are detected in a signal stored in the symbol memory 750. These SSCH symbols are individually detected for each signal through the SSCH detector. After one SSCH symbol is detected, the next SSCH is detected. Namely, when the first SSCH detector operating section 760 for detecting the SSCH symbol A 717 is finished, the second SSCH detector operating section 770 for detecting the SSCH symbol B 727 is initiated. Similarly, when the second SSCH detector operating section 770 is finished, the third SSCH detector operating section 780 for detecting the SSCH symbol C 737 is initiated. After all the SSCH symbols A 717, B 727 and C 737 are completely detected, the mobile device ascertains all frame boundaries and base station information 790 through the detected SSCH symbols 717, 727 and 737.

As fully discussed hereinbefore, the mobile device according to the present invention can detect the SSCH symbol in a signal received from the base station before finishing the detection of the PSCH symbol. Additionally, the mobile device can determine candidates for the PSCH symbol, depending on a valid value of the PSCH symbol. The number of the detected PSCH symbol candidates, the position of the PSCH symbol in the received signal, and the capacity of the symbol memory may be regulated. If the mobile device is configured to detect N PSCH symbols in the received signal, it is possible to use a small memory reduced by 3*N/60.

In addition, if PSCH symbol candidates are located ahead of the PSCH detector operating section on the time axis in a received signal, there may be no difference in time between the finish of the PSCH symbol detection and the finish of the SSCH symbol detection. In this case, the operating section of the SSCH detector may be reduced by N times of the maximum SSCH detector operating time. Such a reduction in the operating section may not only allow detecting much more information about the base station, but also reduce power consumption during the detection of symbols.

According to this invention, the position of the SSCH symbol can be immediately ascertained depending on the validity of the detected PSCH symbol. Additionally, since the SSCH symbol is also detected while the PSCH symbol is detected, there is no need to store a number of received signals in comparison with a conventional technique.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method for detecting a cell in a mobile device, the method comprising:
   when a signal is received from at least one base station, detecting a primary synchronization channel (PSCH) symbol in the signal;
   ascertaining a valid value of the PSCH symbol and determining whether the valid value is greater than a given threshold;
   if the valid value of the PSCH symbol is greater than the threshold, estimating a position of a secondary synchronization channel (SSCH) symbol in the signal using the PSCH symbol;
   detecting the SSCH symbol at the estimated position; and finding a neighboring cell through the detected SSCH symbol.

2. The method of claim 1, further comprising:
if the PSCH symbol is smaller than the threshold, determining whether a detection of the PSCH symbol is finished; and
if the detection of the PSCH symbol is not finished, further detecting the PSCH symbol in the signal.

3. The method of claim 1, wherein the valid value of the PSCH symbol is a correlation value obtained through a matched filter.

4. The method of claim 1, wherein detecting the PSCH symbol includes finding a position of the PSCH symbol through observations on the signal during a time window corresponding to a half frame.

5. An apparatus for detecting a cell, the apparatus receiving a signal in the form of a frame from a base station through a downlink, the apparatus comprising:
a primary synchronization channel (PSCH) detector configured to detect a PSCH symbol in the signal;
a PSCH validity determiner configured to ascertain a valid value of the PSCH symbol and to determine whether the valid value is greater than a given threshold;
a secondary synchronization channel (SSCH) allocator configured to, if the PSCH symbol is greater than the threshold, estimate a position of an SSCH symbol in the signal using the PSCH symbol; and
an SSCH detector configured to detect the SSCH symbol at the estimated position.

6. The apparatus of claim 5, further comprising:
a symbol memory configured to store the signal while the PSCH detector detects the PSCH symbol, and to store at least one SSCH symbol detected through the SSCH detector.

7. The apparatus of claim 6, wherein the SSCH allocator is further configured to, if the PSCH symbol is smaller than the threshold, determine whether a detection of the PSCH symbol is finished, and if the detection of the PSCH symbol is not finished, to detect the PSCH symbol in the signal.

8. The apparatus of claim 5, wherein the valid value of the PSCH symbol is a correlation value obtained through a matched filter.

9. The apparatus of claim 5, wherein the PSCH detector is further configured to find a position of the PSCH symbol through observations on the signal during a time window corresponding to a half frame.

* * * * *